US005580206A

United States Patent [19]

Redelman et al.

[11] Patent Number: 5,580,206

[45] Date of Patent: Dec. 3, 1996

[54] STORAGE AND RETRIEVAL CRANE WITH DUAL DRIVES

[75] Inventors: Paul E. Redelman, Rochester Hills; George J. Bertels, Troy, both of Mich.

[73] Assignee: FKI Industries Inc., Fairfield, Conn.

[21] Appl. No.: 282,735

[22] Filed: Jul. 29, 1994

[51] Int. Cl.$^{6}$ .......... B65G 1/06

[52] U.S. Cl. .......... 414/282; 187/213; 187/258; 414/786

[58] Field of Search .......... 414/277–283, 414/786; 187/210, 213, 256, 255

[56] References Cited

U.S. PATENT DOCUMENTS

| | | | |
|---|---|---|---|
| 3,840,131 | 10/1974 | Castaldi | 414/281 |
| 3,913,766 | 10/1975 | Wentz | 414/282 X |
| 4,307,988 | 12/1981 | Page et al. | 414/281 X |
| 4,936,730 | 6/1990 | Morioka | 414/282 X |
| 5,141,381 | 8/1992 | Kato et al. | 414/281 X |

FOREIGN PATENT DOCUMENTS

| | | | |
|---|---|---|---|
| 3446310 | 6/1986 | Germany | 414/281 |

*Primary Examiner*—David A. Bucci
*Attorney, Agent, or Firm*—Barnes, Kisselle, Raisch, Choate, Whittemore & Hulbert, P.C.

[57] ABSTRACT

A storage and retrieval crane system that includes a tower having a pair of spaced columns and a tower drive mechanism for moving the tower horizontally along a floor between storage racks. A carriage is coupled to a carriage drive mechanism for vertical movement between the columns, and a shuttle is coupled to a shuttle drive mechanism on the carriage for moving the shuttle horizontally from the carriage in directions lateral to direction of movement of the tower along the floor. At least one of the drive mechanisms, and preferably all of the drive mechanisms, include primary and secondary drive arrangements, and facility for selectively alternately connecting one or the other of the primary and secondary drive arrangements to drive the tower, carriage or shuttle. Thus, in the preferred embodiment of the invention, each of the drive mechanisms is fully redundant, so that machine drive may be switched from primary to secondary mechanisms in the event of failure without significant downtime or loss of production.

18 Claims, 5 Drawing Sheets

STORAGE AND RETRIEVAL CRANE WITH DUAL DRIVES

The present invention relates to automated storage and retrieval systems and methods, and more particularly to a crane that is used for storing and retrieving loads on storage racks.

BACKGROUND AND SUMMARY OF THE INVENTION

U.S. Pat. No. 3,913,766 discloses a storage and retrieval crane system that includes a tower having a pair of spaced columns and a tower drive for moving the tower horizontally along rails on a floor between storage racks. A carriage is coupled to a carriage drive mounted on the tower for vertical movement between the columns. A shuttle table is carried by a telescoping by-directional assembly on the carriage, and is coupled to a shuttle drive mechanism for moving the shuttle horizontally from the carriage in directions lateral to the direction of movement of the tower along the floor. By control of motion of the tower along the floor, the carriage on the tower and the shuttle on the carriage, parts are selectively stored in and retrieved from storage racks that extend along opposite sides of the tower rails.

A basic problem in storage and retrieval systems and methods of this character lies in potential malfunction or failure of any one of the drive mechanisms, which in turn causes the entire crane to be taken out of service. It is a general object of the present invention to provide a storage and retrieval system and method that will reduce or eliminate down-time associated with drive system failure in the prior art.

A storage and retrieval crane system in accordance with a presently preferred embodiment of the invention comprises a tower having a pair of spaced columns and a tower drive mechanism for moving the tower horizontally along a floor between storage racks. A carriage is coupled to a carriage drive mechanism for vertical movement between the columns, and a shuttle is coupled to a shuttle drive mechanism on the carriage for moving the shuttle horizontally from the carriage in directions lateral to direction of movement of the tower along the floor. At least one of the drive mechanisms, and preferably all of the drive mechanisms, include primary and secondary drive arrangements, and facility for selectively alternately connecting one or the other of the primary and secondary drive arrangements to drive the tower, carriage or shuttle. Thus, in the preferred embodiment of the invention, each of the drive mechanisms is fully redundant, so that machine drive may be switched from primary to secondary mechanisms in the event of failure without significant down-time or loss of production.

BRIEF DESCRIPTION OF THE DRAWINGS

The invention, together with additional objects, features and advantages thereof, will be best understood from the following description, the appended claims having accompany drawings in which:

DETAILED DESCRIPTION OF THE PREFERRED EMBODIMENTS

The disclosure of U.S. Pat. No. 3,913,766 is incorporated herein by reference.

Figure 1:
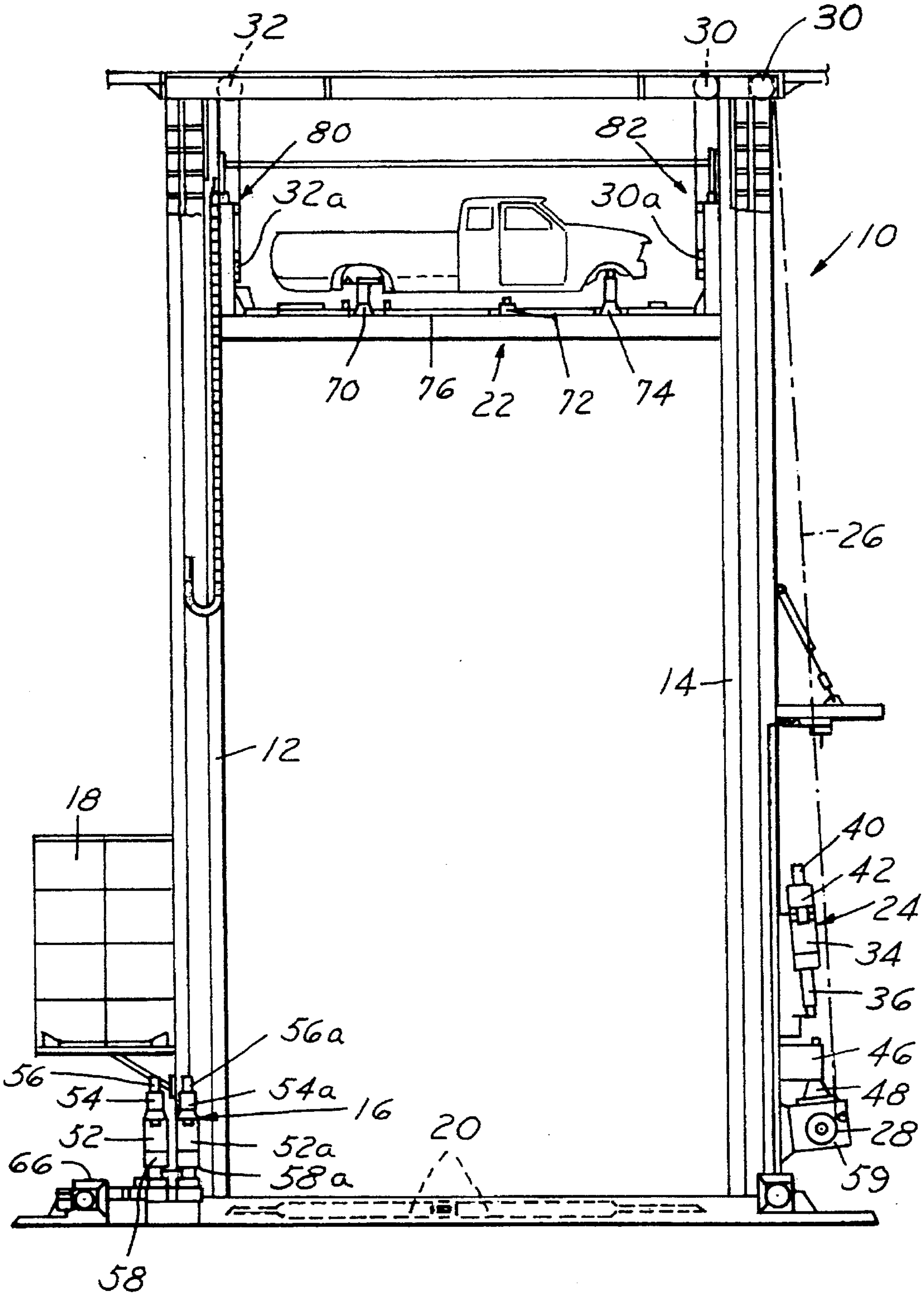
FIG. 1 is an elevational view of a crane in accordance with one presently preferred embodiment of the invention.

FIG. 1 illustrates a stacker crane 10 having a pair of vertical masts or columns 12, 14. A horizontal drive 16 is carried at the base of crane 10 beneath a maintenance platform 18 for driving crane 10 horizontally along a pair of rails (not shown). The usual shock absorbers 20 cushion the crane when the crane is stopped. A carriage 22 is movably supported between columns 12, 14. A vertical or hoist drive assembly 24 is carried at the lower end of column 14. A first cable 26 extends from a drum 28 (FIGS. 1 and 2) over pulleys or sheaves 30 at the upper end of crane 10, and thence to carriage 22 around a sheave **30*a* and back to the frame to a tie-off point not shown. Likewise, a second cable 31 (FIG. 2) extends from a drum 35 around pulleys or sheaves 30 and 32 at the upper end of crane 12, and thence to the opposing end of carriage 22 around a sheave 32*a* and back to the frame to a tie-off point not shown. Thus, rotation of drums 28, 35 winds or unwinds cables 26, 31, and either raises or lowers carriage 22 between columns 12, 14**.

Figure 2:
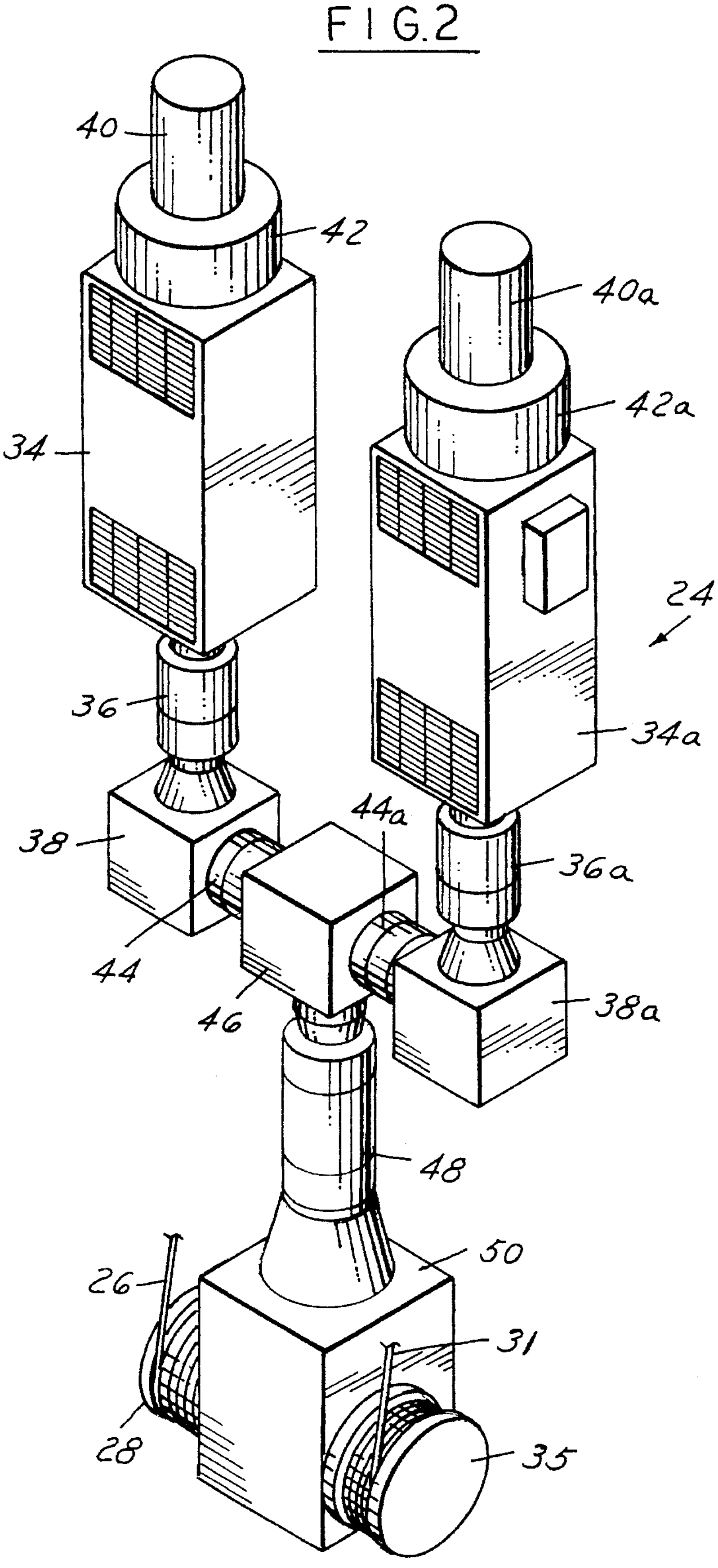
FIG. 2 is a perspective view of the drive system for elevating the carriage.

As shown in FIG. 2, hoist drive 24 comprises a primary electric hoist motor 34 that is connected through a coupling 36 to a right-angle gear or mitre box 38. A tachometer 40 is mounted on motor 34 for indicating speed of rotation, and a disc brake 42 is mounted on and coupled to motor 34 for preventing rotation of motor 34 when not in use. A secondary electric hoist motor **34*a*, with associated tachometer 40*a* and disc brake 42*a*, is connected by a coupler 36*a* to a right-angle gear or mitre box 38*a*. The two gear boxes 38, 38*a* are connected through respective clutches 44, 44*a* to a third gear or mitre box 46, which provides an output through a coupler 48 to a drum drive box 50. Cable drums 28, 35 are mounted on opposed sides of box 50. Clutches 44, 44*a* may comprise conventional chain-type clutches. When the chain is mounted in clutch 44, for example, and disfunction of motor 34, coupling 36 or gear box 38*a* is detected, the chain may be readily manually removed and placed in clutch 44*a*, and whereby secondary drive motor 34*a* becomes fully operational through the associated coupling 36*a* and gear box 38*a*. Clutches 44, 44*a* may also comprise jaw-type mechanical clutches that are so interlocked that only one may be engaged at a time, or may comprise interlocked disc or cone clutches. Alternatively, clutches 44, 44*a*** may comprise any suitable type of electrically operated clutch for fully automated remote control of the hoist drive mechanism.

Figure 3:
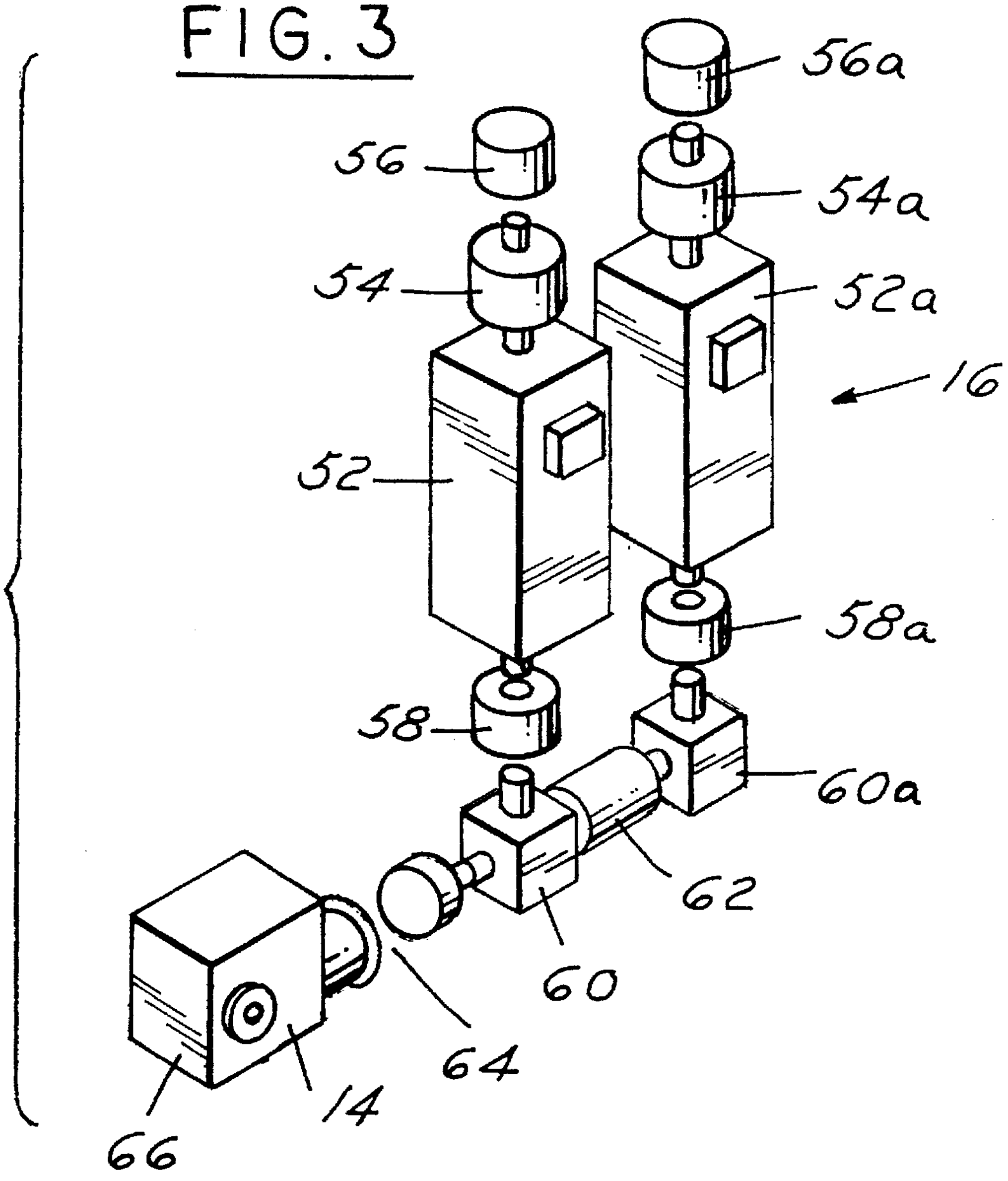
FIG. 3 is an exploded perspective view of the system for driving the crane tower horizontally.

FIG. 3 illustrates horizontal drive 16 as comprising a pair of electric motors 52, **52*a*, each with associated disc brakes 54, 54*a* and tachometers 56, 56*a*. Each motor 52, 52*a* is connected through an associated clutch 58, 58*a* to a mitre or gear box 60, 60*a*. A coupling 62 interconnects gear boxes 60, 60*a*, and a coupling 64 interconnects gear box 60 with a horizontal drive gear box 66. Gear box 66 is connected to the horizontal drive shaft (not shown) for propelling crane 10 along the floor-mounted tracks. Once again, as discussed in detail above, clutches 58, 58*a* alternately and selectively connect motors 52, 52*a* to drive the horizontal drive gear box 66. Clutches 58, 58*a*** may be of any suitable type as discussed above.

Figure 4:
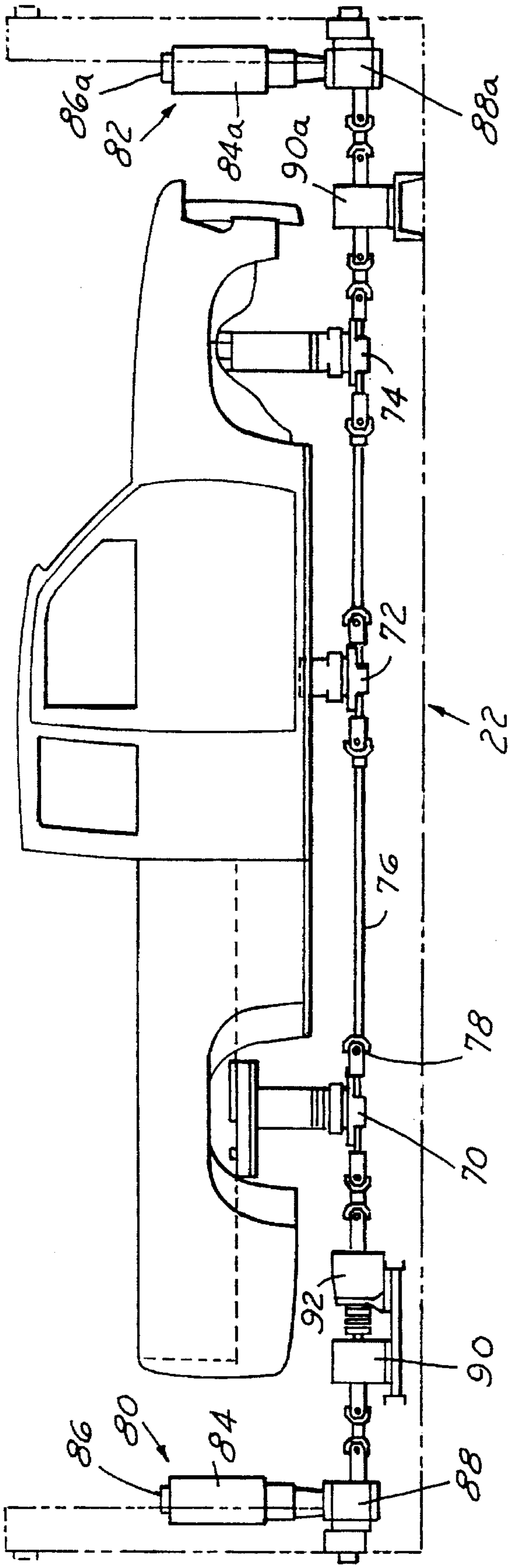
FIG. 4 is an elevational view of the shuttle and shuttle drive mechanism carried on the carriage in FIG. 1.

FIG. 4 illustrates the shuttle drive mechanism carried by carriage 22. Specifically, three shuttles 70, 72, 74 are illustrated as being interconnected by a shuttle drive shaft 76 and various couplings 78. Each shuttle 70, 72, 74 carries an associated pad or table for supporting the desired workpiece, illustrated in FIGS. 1 and 4 as a pick-up truck body. Shuttles 70, 72, 74 are themselves of conventional bi-directional telescoping design, as disclosed in the above-referenced patent, for example. A pair of shuttle drive mechanisms 80, 82 are respectively disposed on opposed ends of carriage 22, and are coupled to respective opposed ends of shuttle drive shaft 76. Each drive mechanism 80, 82 comprises an electric motor 84, 84*a* with associated spring-set brake 86, 86*a* and an output connected to a right-angle gear or mitre box 88, 88*a*. Boxes 88, 88*a* are respectively connected to associated clutches 90, 90*a*, which again are selectively and alternately connected to drive shaft 76. Clutches 90, 90*a* may be of any suitable type as discussed above. A spring-set brake 92 is directly coupled to drive shaft 76 to prevent drift in the event of power loss.

Figure 5:
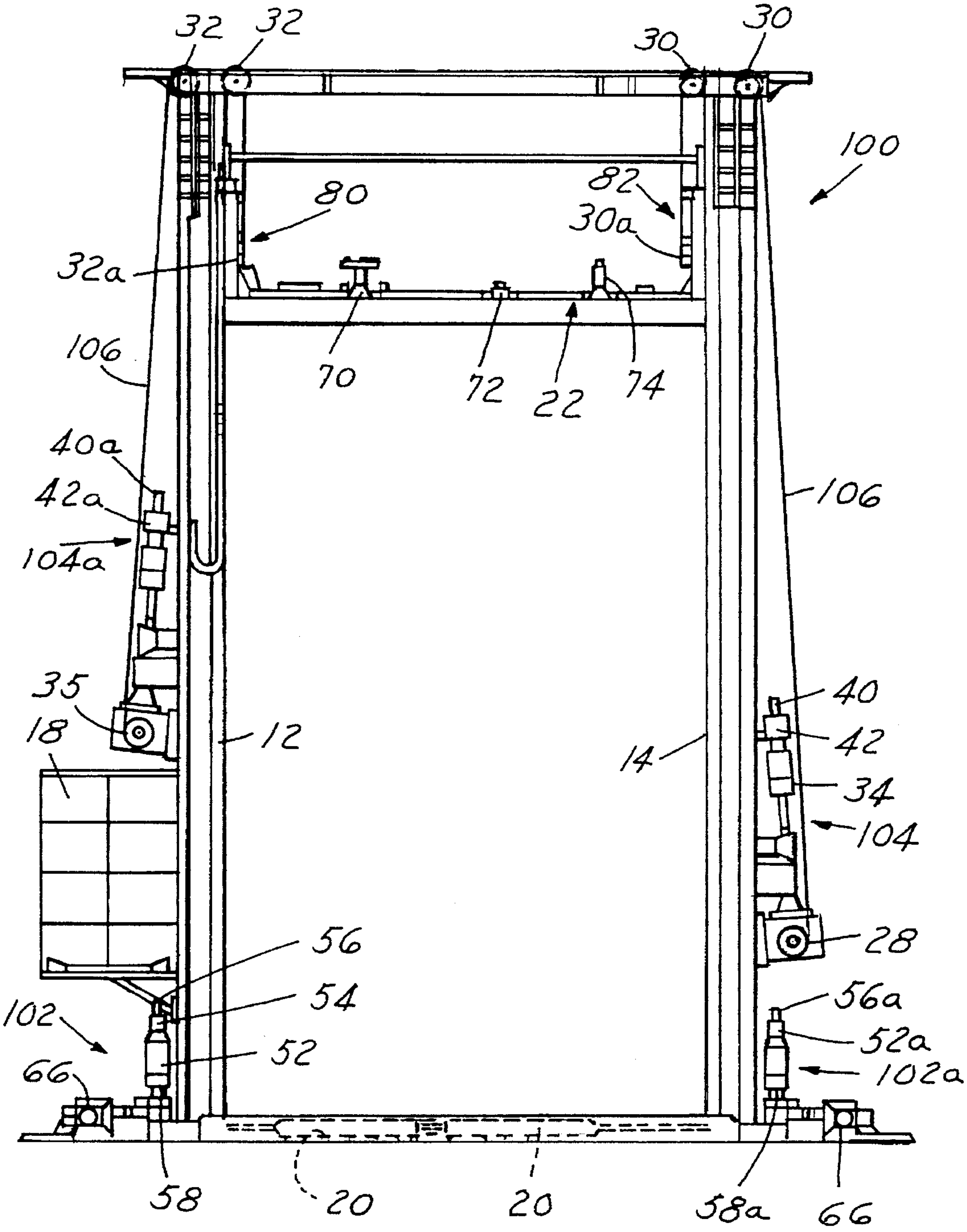
FIG. 5 is an elevational view of a crane in accordance with a modified embodiment of the invention.

FIG. 5 illustrates a modified crane system 100, in which reference numerals identical to those employed in connection with FIGS. 1–4 indicate identical parts or elements. Crane system 100 in FIG. 5 differs from crane system 10 in FIGS. 1–4 primarily in two respects. First, the horizontal drive mechanism 102 is divided in the manner of the shuttle drive mechanism illustrated in FIG. 4, so as to provide two completely independent drive mechanisms. That is, referring to FIGS. 3 and 5, the electric motors 52, 52*a* are disposed on opposite sides of towers 12, 14, and operate through respective independent clutches and gear boxes for driving a main support wheel. Thus, as distinguished from drive arrangement 16 in FIG. 3 in which both motors 52, 52*a* must operate through common gear boxes 60, 62. The drive motors are independently connected to the crane in FIG. 5. The horizontal drive would not be disabled by failure of the gear box 60, 66 or the coupler 64 in FIG. 3. Likewise, the hoist drive is now divided into separate drive segments 104, 104*a* respectfully disposed on opposite sides of the crane. This particular arrangement has the advantage that a single cable 106 extends from drum 28 to drum 35, trained around the sheaves or pulleys 30, 32 at the upper end of crane 100, and around corresponding pulleys 30*a*, 32*a* on carriage 22. Thus, when operating hoist drive 104, for example, hoist drive 104*a* is locked by operation of associated disc brake 42*a* so as to provide an anchor for the cable. The cable is wound onto and unwound from drum 28 by operation of motor 34 for raising or lowering carriage 22.

Thus, in all embodiments of the invention, at least one and preferably all of the tower, carriage and shuttle drive mechanisms comprise primary and secondary drive mechanisms that are at least partially if not completely independent from each other, and with facility for selectively and alternately connecting one or the other of the primary and secondary drive mechanisms to the associated tower, carriage or shuttle. Both the primary and the secondary drive mechanisms comprise an electric motor coupled to an associated gear box, and a clutch for selectively and alternately connecting one or the other of the gear boxes to drive the associated mechanism.

What is claimed is:

1. A storage and retrieval crane comprising a vertical frame, a carriage mounted for vertical movement on said frame, a primary drive assembly for moving said carriage vertically, a secondary drive assembly for moving said carriage vertically, and means for selectively and alternately connecting one or the other of said primary drive assembly and said secondary drive assembly to said carriage, such that said carriage is moved vertically by one or the other, but not both, of said primary and secondary drive assemblies.

2. The storage and retrieval crane set forth in claim 1 wherein each said drive assembly includes a gear box, said selectively connecting means being interposed between said gear boxes.

3. The storage and retrieval crane set forth in claim 2 wherein said selectively connecting means is manually controlled.

4. The storage and retrieval crane set forth in claim 2 wherein said selectively connecting means is electrically controlled.

5. The storage and retrieval crane set forth in any one of claims 1–4 including a shuttle table on said carriage and means for moving said shuttle table horizontally transverse to said carriage, primary drive means for said shuttle table, secondary drive means for said shuttle table, and means for selectively and alternately connecting one or the other of said primary drive means for said shuttle table and said secondary drive means for said shuttle table to said shuttle table, such that said shuttle table is moved horizontally with respect to said carriage by one or the other, but not both, of said associated primary and secondary drive means.

6. The storage and retrieval crane set forth in claim 5 including a support assembly for moving said frame horizontally, a primary drive assembly for said support assembly, a secondary drive assembly for said support assembly, and means for selectively and alternately connecting to said support assembly one or the other of said primary and said secondary drive assemblies for said support assembly, such that said frame is moved horizontally by one or the other, but not both, of said associated primary and secondary drive assemblies.

7. The storage and retrieval crane set forth in claim 5 wherein said selectively connecting means is manually controlled.

8. The storage and retrieval crane set forth in claim 6 wherein said selectively connecting means is electrically actuated.

9. The method of operating a storage and retrieval crane comprising a vertical frame, and a carriage mounted for vertical movement on said frame, said method comprising providing a primary drive assembly for moving said carriage vertically, providing a secondary drive assembly for moving said carriage vertically, and selectively and alternatively connecting one or the other of said primary drive assembly and said secondary drive assembly to said carriage.

10. The method set forth in claim 9 including providing a gear box for each said drive assembly, and selectively connecting one or the other of said gear boxes to said carriage.

11. The method set forth in claim 10 wherein said step of selectively connecting said gear boxes comprises manually selectively connecting one or the other of said gear boxes to said carriage.

12. The method set forth in claim 11 wherein said step of selectively connecting said gear boxes comprises electrically selectively connecting one or the other of said gear boxes to said carriage.

13. The method set forth in any of claims 9–12 including providing primary drive means for moving said carriage horizontally, providing secondary drive means for moving said carriage horizontally, and selectively connecting one or the other of said primary and said secondary drive means to move said carriage horizontally.

14. The method set forth in claim 13 including providing a support assembly for moving said frame horizontally, providing a primary drive assembly for said support assembly, providing a secondary drive assembly for said support assembly and selectively connecting one of said primary drive assembly and said secondary drive assembly to said support assembly.

15. A storage and retrieval crane that comprises:

a tower having a pair of spaced columns and tower drive means for moving said tower horizontally along a floor, a carriage mounted for vertical movement between said columns, and carriage drive means mounted on said tower and coupled to said carriage for moving said carriage vertically between said towers, and shuttle means mounted for horizontal movement on said carriage, and shuttle drive means mounted on said carriage and coupled to said shuttle means for moving said shuttle means horizontally for said carriage in a direction between direction of movement of said tower along the floor, characterized in that at least one of said tower drive means, said carriage drive means and said shuttle drive means comprises:

primary drive means, secondary drive means independent of said primary drive means, and means for selectively alternately connecting one or the other of said primary and secondary drive means to said tower, carriage or shuttle means.

16. The crane set forth in claim 15 wherein said primary drive means and said secondary drive means each comprise an electric motor coupled to an associated gear box, and wherein said selectively connecting means comprises clutch means for selectively alternately connecting one or the other of said gear boxes to the associated tower, carriage or shuttle means.

17. The crane set forth in claim 15 wherein said primary and secondary drive means comprise carriage drive means, said carriage drive means further comprising a pair of drums, cable means wound around and extending from said drums, and sheaves on said tower above said carriage, said cable means being trained over said sheaves and operatively coupled to opposite sides of said carriage adjacent to said columns.

18. The crane set forth in claim 17 wherein said primary and secondary drive means are disposed on respective opposed columns of said tower, said cable comprising a continuous cable trained for a drum coupled to said primary drive means to said sheaves and said carriage to a drum coupled to said secondary drive means.

* * * * *